United States Patent
Hatakeyama et al.

(10) Patent No.: US 10,521,659 B2
(45) Date of Patent: Dec. 31, 2019

(54) IMAGE PROCESSING DEVICE, IMAGE PROCESSING METHOD, AND IMAGE PROCESSING PROGRAM

(71) Applicant: YAZAKI CORPORATION, Tokyo (JP)

(72) Inventors: Masaya Hatakeyama, Shizuoka (JP); Naotake Sakumoto, Shizuoka (JP); Kazushige Nagai, Shizuoka (JP); Yuki Takahashi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 140 days.

(21) Appl. No.: 15/817,121

(22) Filed: Nov. 17, 2017

(65) Prior Publication Data

US 2018/0144179 A1    May 24, 2018

(30) Foreign Application Priority Data

Nov. 21, 2016 (JP) .................................. 2016-225728
Sep. 14, 2017 (JP) .................................. 2017-176497

(51) Int. Cl.
*G06K 9/00* (2006.01)
*G06T 7/73* (2017.01)
*G06T 7/13* (2017.01)

(52) U.S. Cl.
CPC .............. *G06K 9/0061* (2013.01); *G06T 7/13* (2017.01); *G06T 7/75* (2017.01); *G06T 2207/20076* (2013.01); *G06T 2207/30201* (2013.01)

(58) Field of Classification Search
CPC ............. G06K 9/00281; G06K 9/4614; G06K 9/6204; G06K 9/0061; G06T 7/75; G06T 7/13; G06T 2207/20076; G06T 2207/30201
See application file for complete search history.

(56) References Cited

U.S. PATENT DOCUMENTS

2014/0056529 A1   2/2014  Ruan et al.
2014/0072230 A1*  3/2014  Ruan ................... G06K 9/0061
                                                          382/199

FOREIGN PATENT DOCUMENTS

JP         2012-190351 A     10/2012

* cited by examiner

*Primary Examiner* — Brenda C Bernardi
(74) *Attorney, Agent, or Firm* — Kenealy Vaidya LLP

(57) ABSTRACT

An image processing device includes a data processing unit that processes data of a face image which is captured to include a face. The data processing unit generates an edge image by filtering the face image to detect an edge in a scanning direction, extracts a sampling value as the information regarding a gradient magnitude and whether the gradient is positive or negative from each of positions in the edge image corresponding to a plurality of points constituting the sampling curve, calculates a likelihood with respect to the sampling curve by setting points having a positive gradient and a negative gradient as likelihood evaluation targets in a first point group and a second point group, and detects a sampling curve having a maximum likelihood as a pupil or an iris among a plurality of sampling curves.

6 Claims, 14 Drawing Sheets

IMAGE PROCESSING DEVICE, IMAGE PROCESSING METHOD, AND IMAGE PROCESSING PROGRAM

CROSS REFERENCE TO RELATED APPLICATION

This application is based on Japanese Patent Application Nos. 2016-225728 filed on Nov. 21, 2016, and 2017-176497 filed on Sep. 14, 2017, the contents of which are incorporated herein by reference.

BACKGROUND OF THE INVENTION

1. Technical Field

The present invention relates to an image processing device, an image processing method, and an image processing program, and particularly relates to a technique which can be used for estimating eye features such as a gaze based on an image obtained by capturing the face of a person.

2. Background Art

In the related art, an image processing device that processes data of an image obtained by capturing the face of a person using a camera to identify eye features (for example, JP-A-2012-190351).

An object of a technique disclosed in JP-A-2012-190351 is to accurately detect a pupil region.

The image processing device disclosed in JP-A-2012-190351 includes: a second differentiation unit 41 that differentiates an eye region of a face image where an eye is present at least in a longitudinal direction of the eye to obtain a luminance gradient; a binarization unit 42 that binarizes the luminance gradient of the eye region to extract an edge point; and an eyelid outline identification unit 44 that identifies a curve, which is expressed by both end points and a control point and fits to the edge point, as a curve expressing an outline of an upper eyelid or a lower eyelid, the end points being an internal canthus point of eye and an outer canthus point.

In a device that estimates a gaze of a person by image-processing a moving image of the face of the person, it is desirable to accurately detect a central coordinate of a black part of an eye, that is, an iris region or a pupil region in the image.

For example, in a method of detecting a black part of an eye in the image processing disclosed in JP-A-2012-190351, an edge in an image is used as a detection feature. Specifically, an absolute value obtained by filtering using a differentiation filter such as the Sobel filter is used as a feature amount.

However, in this method, an edge is unconditionally generated from an object other than a detection target, for example, reflection of light projected on an eyelid, an eyebrow, or an eyeball. Therefore, deterioration of detection accuracy or erroneous detection may occur. In a case where a detection position of a black part of an eye deviates, an error occurs during estimation of a gaze.

In addition, in the technique disclosed in JP-A-2012-190351, the Hough transform is used. Therefore, an increase in throughput is inevitable for high accuracy, and the hardware of a computer is required to have high processing capacity. During binarization or ternarization of image data, a threshold becomes an issue, and the result is likely to be affected by ambient light during capturing. In a case where an ellipse detection algorithm is used, it is difficult to detect a target itself in a state where an eye moves sideways and a shape of a black part of the eye on a two-dimensional image is significantly collapsed.

The invention has been made in consideration of the above-described circumstances, and an object thereof is to provide an image processing device, an image processing method, and an image processing program which are capable of accurately detecting a pupil or an iris.

SUMMARY OF THE INVENTION

In order to achieve the object, an image processing device according to the invention includes the following (1) to (4).

(1) An image processing device includes:
a data processing unit that processes data of a face image which is captured to include a face,
wherein the data processing unit:
generates an edge image, which stores information regarding a gradient magnitude and whether the gradient is positive or negative, by filtering the face image to detect an edge in a scanning direction;
extracts, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;
calculates a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and
detects a sampling curve having a maximum likelihood as a pupil or an iris among a plurality of sampling curves.

(2) In the image processing device according to (1), the scanning direction in which the data processing unit detects an edge by filtering is a direction in which eyes are aligned in the face image.

(3) In the image processing device according to (2), the sampling curve has an arc shape and is projected on the edge image in a state where a bottom as a most swelling part of the arc faces downward in the three-dimensional model.

(4) In the image processing device according to (1), the data processing unit calculates a likelihood with respect to the sampling curve by adding gradient magnitudes of the points having a positive gradient in the first point group and adding gradient magnitudes of the points having a negative gradient in the second point group.

In the image processing device having the above-described configuration according to (1), even in a highly disturbed environment, bad influences of unnecessary features which generate noise can be avoided with a small calculation amount, and a pupil or an iris can be accurately detected. In general, in a case where edge information is used for recognizing an image, an absolute value is used to remove a sign. However, in a case where a detection target is limited to the pupil or the iris, the detection accuracy can be improved by using not only a gradient magnitude but also a difference between positive and negative signs in each edge of an image in order to separate the pupil or the iris as the detection target from ambient noise (for example, projection of light). For example, in a case where an image region of an eyeball is sequentially scanned from the left to the right, the number of points having a positive gradient in the first point group is large in a right outline position of the iris in boundaries of a white part of an eye and an iris or a right outline position of the pupil in boundaries of the iris and the pupil, and the number of points having a negative gradient in the second point group is large in a left outline position of the iris or a left outline position of the pupil. Therefore, the likelihood is the maximum in a state where the position of the sampling curve matches with the outline position of the pupil or the iris. This way, the pupil or the iris can be accurately detected.

In the image processing device having the above-described configuration according to (2), information required to accurately recognize an iris position can be efficiently obtained. Assuming that the scanning direction in which an edge is detected is a vertical direction of an eye, a boundary adjacent to an outline of an iris of the eye may be an upper eyelid or a lower eyelid. Since an eyelid is likely to be affected by ambient light or makeup, it is difficult to detect a boundary with the iris on an edge image. However, by determining the scanning direction in which an edge is detected as a direction in which eyes are aligned in the face image, for example, in a horizontal direction, there is little influence of an upper eyelid or a lower eyelid. Therefore, the detection accuracy of the iris is improved.

In the image processing device having the above-described configuration according to (3), information required to accurately recognize an iris position can be efficiently obtained. In an eye region of a general face image, an upper end portion of an iris is adjacent to an upper eyelid, or a part of an iris is covered with an upper eyelid in many cases. Therefore, it is difficult to detect an outline of the upper end side of the iris. On the other hand, in right and left sides and a lower end portion of the iris, a boundary with a white part clearly appears in many cases. Therefore, it is easy to detect an outline of the iris. Accordingly, by adopting an arc shape in a state where the bottom as the most swelling part of the arc faces downward, it is easy to detect the outline portion of the iris of the eye.

In the image processing device having the above-described configuration according to (4), a feature of an edge of a boundary from the iris to a white part of an eye or a boundary from the pupil to the iris in a scanning direction is detected as a gradient magnitude of the points having a positive gradient, and a feature of an edge of a boundary from the white part to the iris or a boundary from the iris to the pupil in the scanning direction is detected as a gradient magnitude of the points having a negative gradient. Based on these features, likelihood can be calculated.

In order to achieve the object, an image processing method according to the invention includes the following (5).

(5) An image processing method uses an image processing device including a data processing unit that processes data of a face image which is captured to include a face.

The image processing method includes:
generating an edge image, which stores information regarding a gradient magnitude and whether the gradient is positive or negative, using a filter that detects an edge in the face image in a scanning direction;
extracting, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;
calculating a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and
detecting a sampling curve having a maximum likelihood as a pupil or an iris among a plurality of sampling curves.

In the image processing method having the above-described configuration according to (5), as in the case of the image processing device according to (1), even in a highly disturbed environment, bad influences of unnecessary features which generate noise can be avoided with a small calculation amount, and the pupil or the iris can be accurately detected.

In order to achieve the object, an image processing program according to the invention includes the following (6) or (7).

(6) A non-transitory computer readable medium stores a program causing a computer to execute a process for processing an image which is captured to include a face. The process includes:
generating an edge image, which stores information regarding a gradient magnitude and whether the gradient is positive or negative, using a filter that detects an edge in the face image in a scanning direction;
extracting, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;
calculating a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and
detecting a sampling curve having a maximum likelihood as a pupil or an iris among a plurality of sampling curves.

(7) An image processing program allows a computer to execute the respective steps of the image processing method according to (5).

By allowing a predetermined computer to execute the image processing program having the above-described configurations according to (6) or (7), as in the image processing device according to (1), even in a highly disturbed environment, bad influences of unnecessary features which generate noise can be avoided with a small calculation amount, and the pupil or the iris can be accurately detected.

In the image processing device, the image processing method, and the image processing program according to the invention, the pupil or the iris can be accurately detected. The invention is useful because, even in a highly disturbed environment which causes detection error, bad influences of unnecessary features which generate noise can be avoided with a small calculation amount.

Hereinafter, the invention will be simply described. Further, the details of the invention will be further clarified by describing the following embodiments of the invention (hereinafter, referred to as "embodiments") with reference to the accompanying drawings.

DETAILED DESCRIPTION OF THE EMBODIMENT

Specific embodiments relating to an image processing device, an image processing method, and an image processing program according to the invention will be described below with reference to the drawings.

<Specific Example of Environment of Invention>

Figure 1:
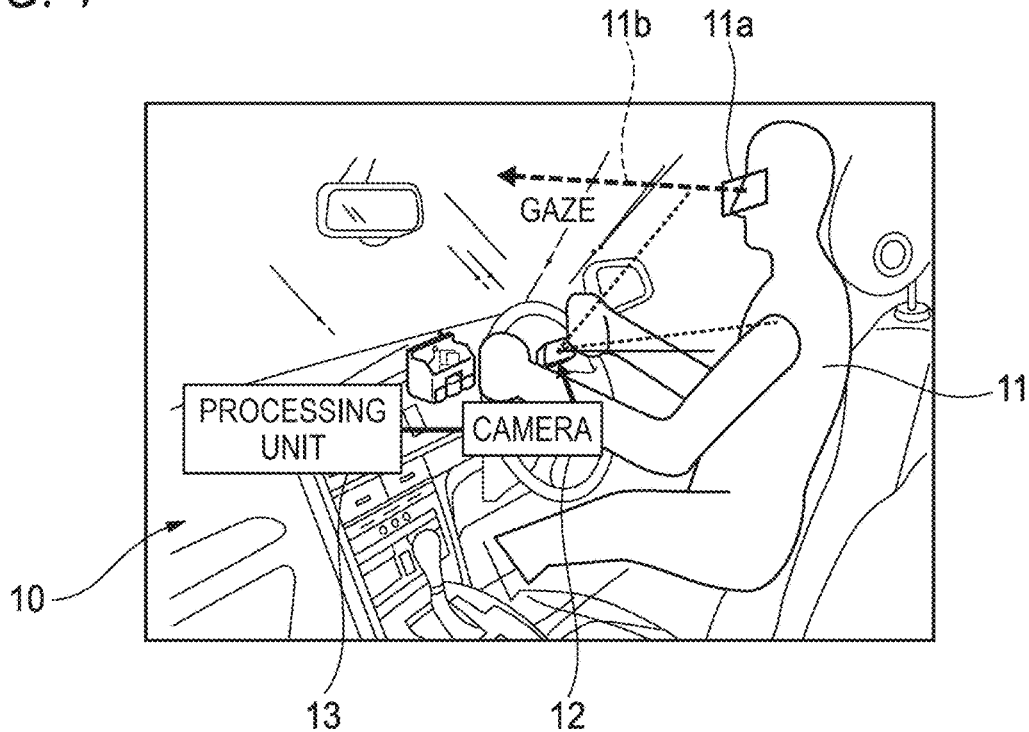
FIG. 1 is a perspective view illustrating a specific example of a state where an image processing device mounted on a vehicle is disposed.

FIG. 1 illustrates a specific example of a state where an image processing device mounted on a vehicle is disposed.

In the example illustrated in FIG. 1, a camera 12 and a processing unit 13 are provided in a vehicle interior 10. Specifically, the camera 12 is provided in a meter unit or a steering column cover in front of a person 11 sitting on a driver's seat, that is, a driver such that a face and the like of the driver including an eye region 11$a$ are imaged by the camera 12.

The processing unit 13 processes two-dimensional image data which is obtained by capturing the face of the person 11 with the camera 12 and estimates information regarding a direction of a gaze 11$b$ based on data of the eye region 11$a$. The information of the gaze 11$b$ estimated by the processing unit 13 can be used for an on-board unit to recognize whether or not the driver who drives the vehicle moves the gaze for safety check. Of course, the information of the gaze can be used for various applications. Accordingly, it is assumed that the image processing device according to the invention can be configured, for example, as the processing unit 13 in FIG. 1 or as a part of the processing unit 13.

<Summary of Gaze Detection Algorithm>

Figure 2:
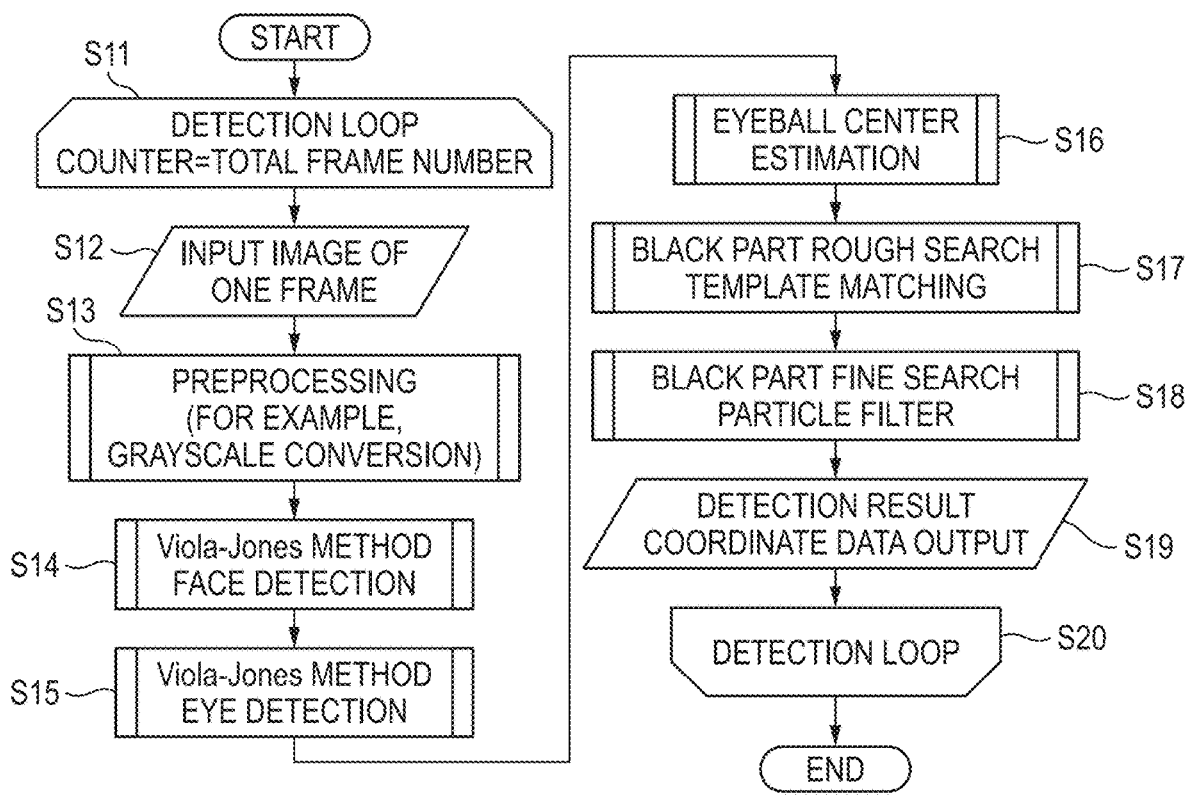
FIG. 2 is a flowchart illustrating the summary of a gaze detection algorithm implemented by an image processing device according to an embodiment of the invention.

The summary of a gaze detection algorithm implemented by an image processing device according to an embodiment of the invention will be described. FIG. 2 is a flowchart illustrating the summary of the gaze detection algorithm implemented by the image processing device according to the embodiment of the invention. By allowing a computer of the image processing device to execute a predetermined program, operations conforming to the gaze detection algorithm illustrated in FIG. 2 are sequentially performed.

The camera 12 captures images of a region including the face of the person 11 at regular intervals and outputs image signals. The computer of the image processing device stores image signals of one frame from the camera 12 in Step S12.

In the next Step S13, image data format conversion including grayscale conversion, that is, "preprocessing" is performed. For example, a two-dimensionally (2D) arranged image data is generated in which 8-bit data representing luminance in a gradation range of "0 to 255" is vertically and horizontally arranged at each of pixel positions in one frame in a scanning direction during capturing.

In the next Step S14, for example, the face is detected using "Viola-Jones method", and a region including the face is extracted as a rectangular region from the two-dimensional image data of one frame. That is, a difference in the shading of the face is set as a feature, and a face region is extracted using a detector which is prepared using "boosting" learning. The technique of the "Viola-Jones method" is disclosed in, for example, the following document: "P. Viola and M. J. Jones, "Rapid Object Detection Using a Boosted Cascade of Simple Features," IEEE CVPR (2001)."

In the next Step S15, for example, an eye region is detected using "the Viola-Jones method" from data of the rectangular face region extracted in S14.

In addition, in the embodiment, a case where a gaze is detected with a model-based method using an eyeball 3D model described below is assumed, and thus it is necessary to identify an eyeball center. This eyeball center is estimated in Step S16. Here, a central coordinate of the rectangular eye region detected in Step S15 is assumed as the eyeball center. For example, it is assumed that, a method of determining an eyeball center based on positions of an internal canthus and an outer canthus of eye, or a method of calculating an eyeball center position while estimating a face outline based on feature points of the face is used.

In Step S17, a rough search of a pupil or an iris is performed by applying a template matching method to data of the rectangular eye region detected in Step S15. Specifically, a black circle image as a template is disposed to match with a binarized image of an eye image obtained by cutting the periphery of the eye, a coordinate of the center of the black circle image (the center of the black circle) having the maximum likelihood is estimated as a center position of the pupil or the iris in the eye image, and the radius of the black circle image having the maximum likelihood is estimated as the radius of the pupil or the iris in the eye image. The process in Step S17 is performed to set an approximate target regarding the center position and radius of the pupil or the iris in the eye image.

In Step S18, a method of a particle filter is applied and the center position and radius of the pupil or the iris searched in S17 are used to detect more accurately the center position and radius of the pupil or the iris. Step S18 includes the characteristic process of the invention. Therefore, the details of Step S18 will be described below.

Through the processes of Steps S13 to S18, data of the eyeball center coordinate and data of the coordinate of the center position of the pupil or the iris can be obtained from an image of one frame, and the numerical data thereof is output in Step S19. A gaze direction can be identified based on the eyeball center coordinate and the coordinate of the center position of the pupil or the iris. In addition, a gaze can be detected in real time by repeating the loop processes of Steps S11 to S20 until the outputting of images from the camera 12 is stopped.

<Description of Eyeball 3D Model>

Figure 3:
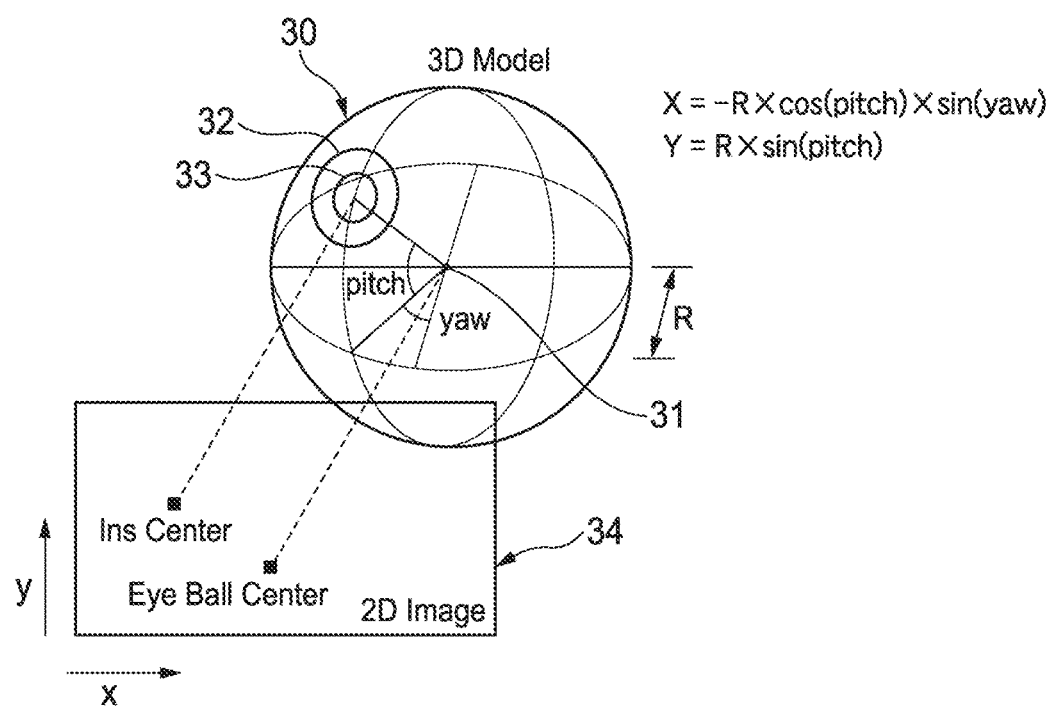
FIG. 3 is a schematic diagram illustrating a relationship between a three-dimensional model of an eyeball and a two-dimensional image.

FIG. 3 illustrates a relationship between a three-dimensional (3D) model of an eyeball and a two-dimensional (2D) image.

In an eyeball 3D model 30 illustrated in FIG. 3, the eyeball is a spherical body expressed by an eyeball center 31 and a radius R. In addition, a circular iris 32 of the eye is present on the surface of the eyeball, and a circular pupil 33 is present at the center of the iris 32.

Accordingly, a gaze direction can be identified as a direction moving from the eyeball center 31 to the center of the iris 32 or the pupil 33 and can be expressed by a yaw and a pitch, the yaw being a rotation angle with respect to a reference direction in a horizontal plane, and the pitch being a rotation angle with respect to a vertical reference direction. In a case where the eyeball center 31 is used as a reference, a central coordinate of the iris 32 or the pupil 33 can be expressed by an eyeball radius R, a yaw, and a pitch.

On the other hand, an image captured by the camera 12 expresses a specific two-dimensional plane. Therefore, in a case where a two-dimensional image 34 captured by the camera 12 is applied to the eyeball 3D model 30, it is necessary to perform interconversion between the two-dimensional image and three-dimensional image. Therefore, for example, the interconversion is performed using the following calculation expression.

$$X = -R \times \cos(\text{pitch}) \times \sin(\text{yaw}) \quad (1)$$

$$Y = R \times \sin(\text{pitch}) \quad (2)$$

X: the distance from the eyeball center 31 on a plane of the two-dimensional image in an x direction Y: the distance from the eyeball center 31 on a plane of the two-dimensional image in a y direction <Specific Example of Process of Searching Iris from Image>

In the following, first a specific example of a process of searching the iris from the image.

<Description of Process of Gaze Detection Algorithm of Related Art>
<Flow of Process>

Figure 4:
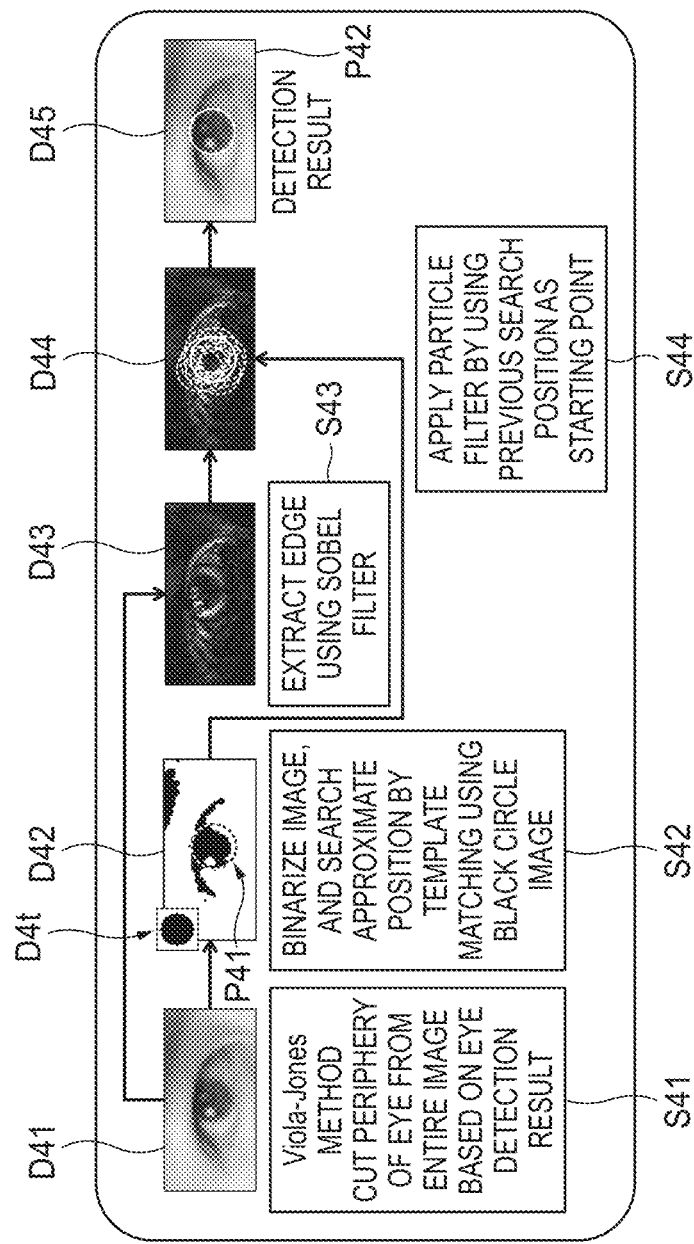
FIG. 4 is a diagram illustrating a specific example of the flow and data of a process of searching an iris from an image in a gaze detection algorithm of the related art.

Before describing the details of the gaze detection algorithm implemented by the image processing device according to the embodiment of the invention, the details of a gaze detection algorithm of the related art will be described. FIG. 4 is a diagram illustrating a specific example of the flow and data of a process of searching an iris from an image in the gaze detection algorithm of the related art.

In Step S41 of FIG. 4, a rectangular region including the eye and the periphery of the eye is cut from two-dimensional image data of one frame using the result of Step S15 of FIG. 2, and data D41 is obtained.

In Step S42 of FIG. 4, Data 42 is generated by binarizing the data D41 obtained in S41 such that pixels have two gradation values of black and white. Next, the template matching of Step S17 of FIG. 2 is performed on the data D42. That is, while scanning the image of the data D42 using a template which is a black circular image D4t having a similar shape to an iris, an approximate iris position P41 having the most similar feature is searched, and the position and the radius or diameter of the iris are identified.

In Step S43 of FIG. 4, a Sobel filter process is performed on the eye data D41 obtained in Step S41. Specifically, the eye data D41 is sequentially scanned in the horizontal direction from the left to the right, black (gradation value: 0) is output for a portion having no change in luminance, and as the gradient of a change in luminance increases, the output value becomes closer to white (gradation value: 255). This way, an edge is detected. As a result, data D43 of the eye image in which the edge is extracted is obtained.

In Step S44 of FIG. 4, a particle filter process is performed on the data D43 of the eye image obtained in Step S43 by using the approximate iris position obtained in Step S42 as a starting point.

<Process of Detecting Iirs Using Particle Filter>

Figure 5:
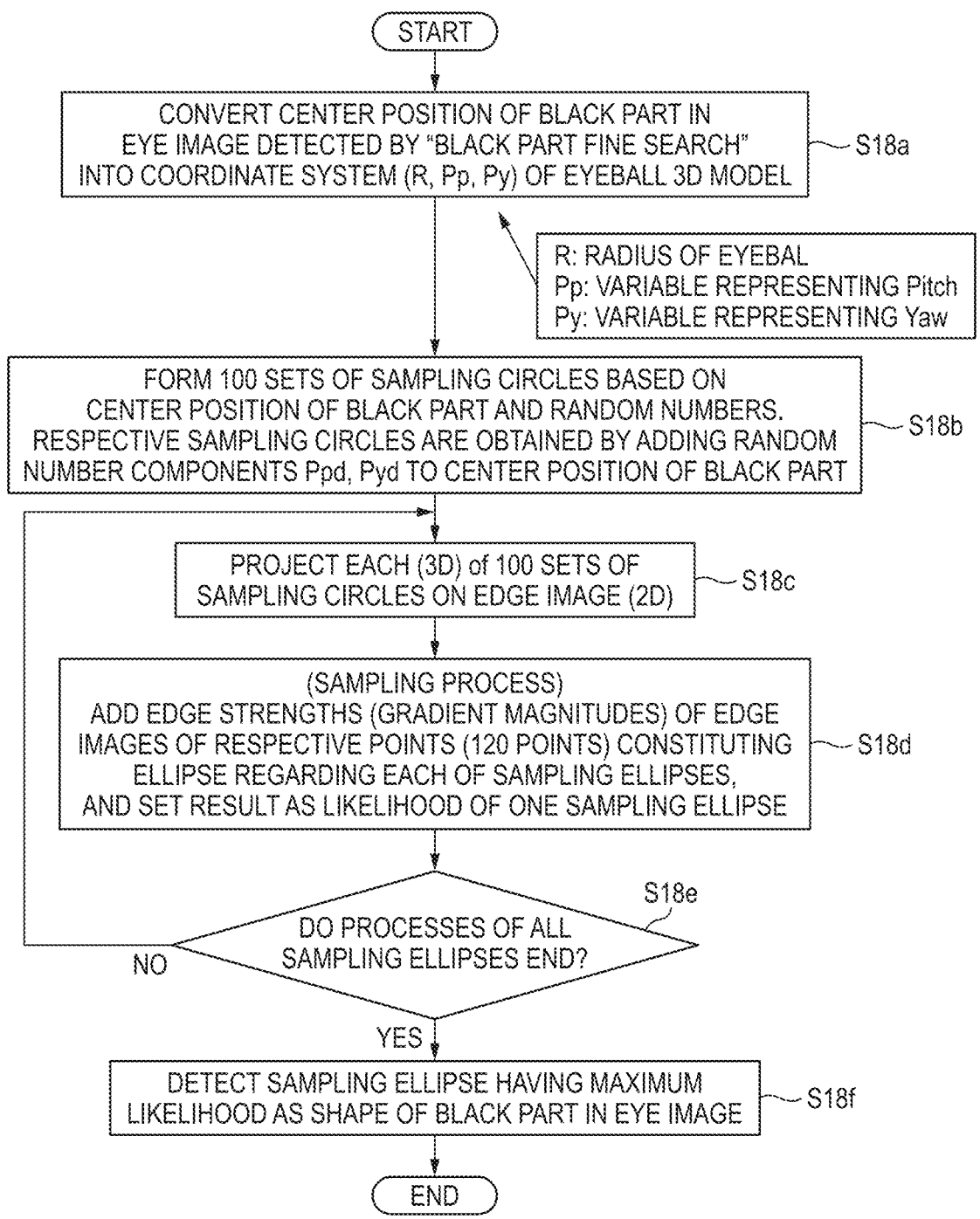
FIG. 5 is a flowchart illustrating the details of Step S18 illustrated in FIG. 2.
Figure 6:
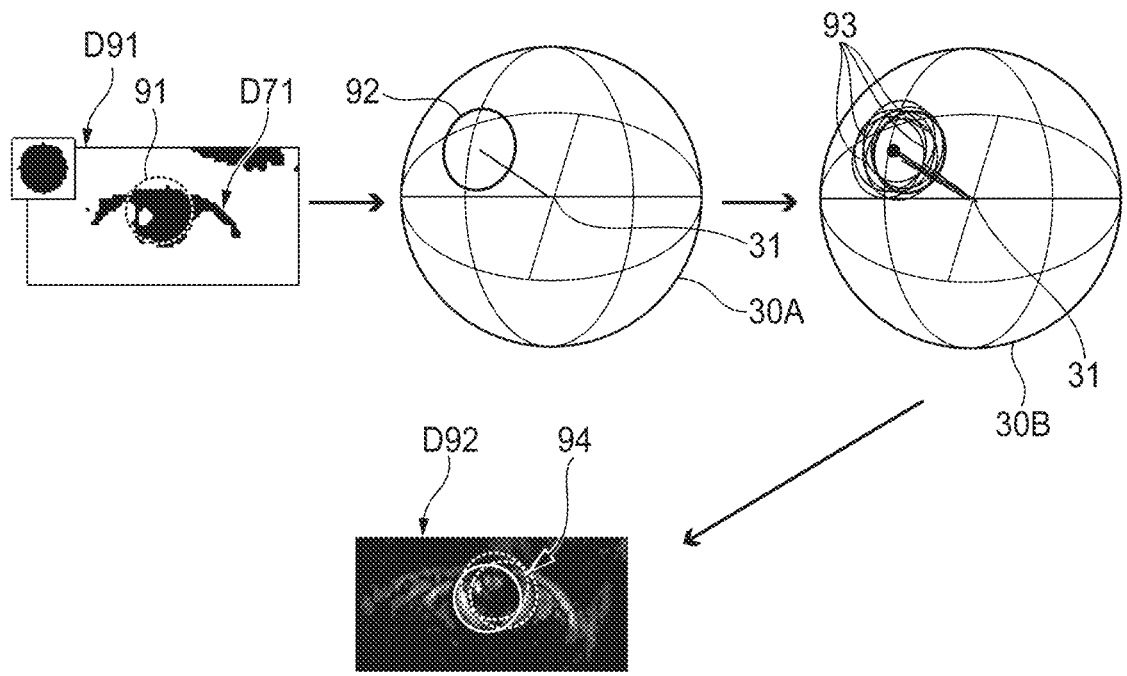
FIG. 6 is a schematic diagram illustrating a specific example of processing data in a case where a process illustrated in FIG. 5 is performed.

FIG. 5 illustrates the details of Step S44 illustrated in FIG. 4. That is, FIG. 5 illustrates the process for detecting the iris position using the particle filter. FIG. 6 illustrates a specific example of processing data in a case where the process illustrated in FIG. 5 is performed.

By performing the rough search of Step S42 on binarized data D91 of FIG. 6, a circular iris region 91 is detected. In Step S18a of FIG. 5, a center position of the iris obtained by the rough search of Step S17 or S42 is converted into a coordinate system (R, Pp, Py) of the eyeball 3D model 30 based on Expressions (1) and (2), and an eyeball rotation angle (Pp, Py) representing the center position of the iris is obtained.

R: an eyeball radius
Pp: a variable representing a rotation angle pitch
Py: a variable representing a rotation angle yaw Accordingly, a position of a circular iris region 92 obtained by the rough search can be reflected on an eyeball surface position on the eyeball 3D model 30A as illustrated in FIG. 6.

In Step S18b of FIG. 5, plural particles required to detect actual iris position candidates are scattered around the center position (Pp, Py) of the iris obtained by the rough search. Specifically, for example, 100 sets of sampling circles 93 are formed using random numbers. These sampling circles 93 can be reflected on eyeball surface positions on an eyeball 3D model 30B as illustrated in FIG. 6. Each of the sampling circles 93 is a circular region centering on a position obtained by adding different random number components (Ppd, Pyd) to the center position (Pp, Py) of the iris.

Ppd: a random number component added to the rotation angle pitch

Pyd: a random number component added to the rotation angle yaw

During the formation of the 100 sets of sampling circles 93, each random number component (Ppd, Pyd) is generated so as to add a random noise according to a normal distribution. Accordingly, as in the eyeball 3D model 30B illustrated in FIG. 6, the sampling circles 93 are randomly formed at various positions around the iris region 92.

In Step S18c of FIG. 5, each of the 100 sets of sampling circles 93 is projected on a plane of an edge image D92 (corresponding to the data D43 in FIG. 4) illustrated in FIG. 6. The shape of the iris region 92 and each of the sampling circles 93 is circular. However, unless the position of each of the circles faces the front of the camera 12, each of the circles on the eyeball 3D model 30 is projected on a plane of a two-dimensional image in a state where it is inclined. Therefore, the shape of the circle is elliptical on a two-dimensional plane. Thus, for convenience of description, the sampling circle 93 projected on a two-dimensional plane is called a sampling ellipse 94. The sampling ellipse 94 includes plural points which are equally allocated to respective positions on an arc.

In Step S18d of FIG. 5, "sampling process" described below is performed. That is, regarding each of the sampling ellipses 94, the edge strengths (gradient magnitudes) of edge images of points (in this example, 120 points in total) constituting the ellipse are added, and the result is set as a likelihood of one sampling ellipse 94.

Regarding all the 100 sets of sampling ellipses 94, the processes of Steps S18c and S18d are repeated. Once all the processes end, the process proceeds from Step S18e to Step S18f. In Step S18f, among the 100 sets of sampling ellipses 94, one sampling ellipse 94 having the maximum likelihood which is detected in Step S18d is identified, and the position and shape thereof are detected as the actual iris position and shape. Hereinabove, the process of detecting the iris using a particle filter in the gaze detection algorithm of the related art has been described.

<Description of Detection Position Deviation in Gaze Detection Algorithm of Related Art>

Figure 7:
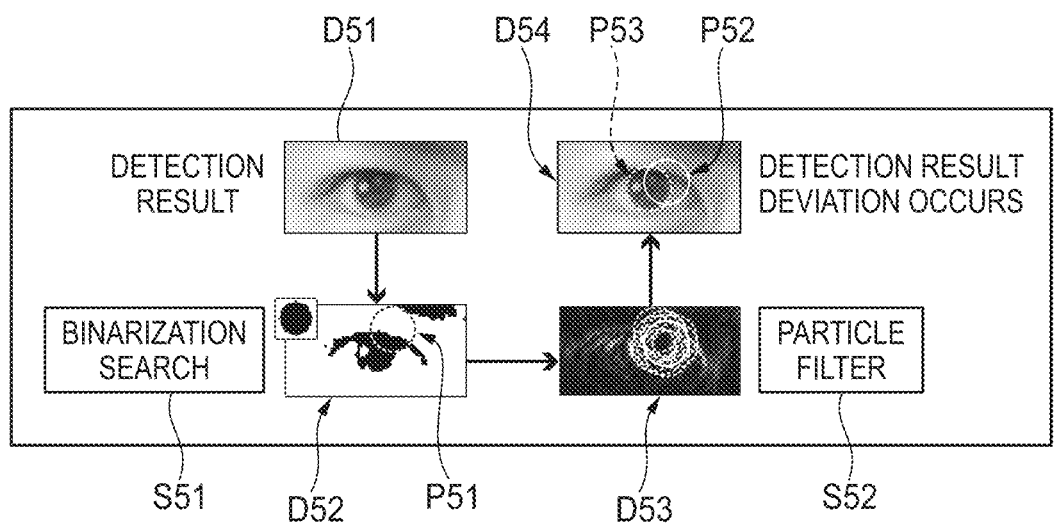
FIG. 7 is a diagram illustrating how a detection position of an iris deviates due to the gaze detection algorithm of the related art.

FIG. 7 is a diagram illustrating how a detection position of an iris deviates due to a gaze detection algorithm of the related art. Assuming that the image processing device that performs the above-described processes is used in, for example, an outdoor environment, the detection accuracy deteriorates due to ambient light.

For example, in a case where a binarization search S51 (corresponding to Steps S17 and S42) is performed on binarized data D52 which is generated based on eye image data D51 illustrated in FIG. 7, an iris position P51 may be erroneously detected. As a result, in a case where the above-described particle filter process S52 is applied to an edge image D53, a starting point at which particles are scattered deviates. During likelihood evaluation, edge information other than the iris is likely to be collected. Finally, the detection accuracy deteriorates.

The reason for this is as follows: an upper eyelid is irradiated with the sunlight, and thus a black portion is formed in the upper eyelid in the binarized image. In a case where binarization template matching is performed on this image, it is determined that an iris is positioned at the upper eyelid in the eye image. Sampling circles are formed based on this position. Therefore, positions of 100 sets of sampling circles deviate to the upper eyelid side as a whole. The position deviation is also significant in the result of particle filter process.

In image data D54 illustrated in FIG. 7, an actual iris position is P53, but a position P52 which significantly deviates from P53 is detected as the result of the particle filter process S52. This way, in a case where the iris is detected using the gaze detection algorithm of the related art, the detection position of the iris may be deviated as described above.

Process of First Embodiment

In order to suppress the detection position deviation of the iris illustrated in FIG. 7, the image processing device according to the embodiment includes the following <Configuration A> and <Configuration B>
<Configuration A>

An edge image, which stores information regarding a gradient magnitude and a positive or negative sign of gradient, is generated by filtering a face image to detect an edge in a scanning direction. For example, in a case where an edge is extracted and the data D43 is generated in Step S43 illustrated in FIG. 4, a special edge image, which stores information regarding a gradient magnitude and a positive or negative sign of gradient, is generated.
<Configuration B>

A likelihood with respect to a sampling curve is calculated by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve.
<Specific Example of "Configuration A">

Figure 8A:
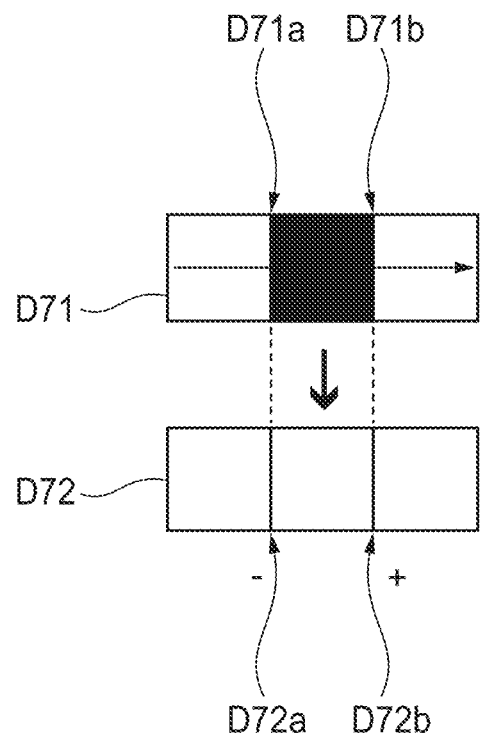
FIG. 8A is a diagram illustrating an example of a scanning direction of the Sobel filter, which detects an edge from an image, and a processed state and a non-processed state of each data.
Figure 8B:
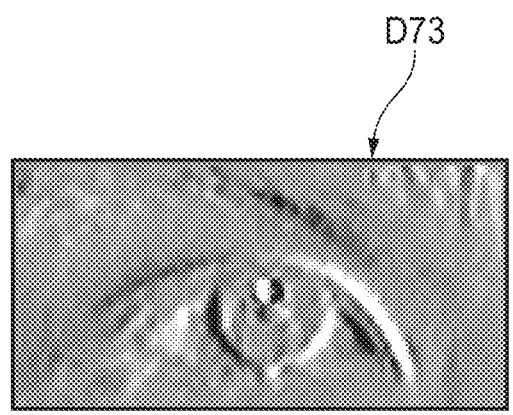
FIG. 8B is a diagram illustrating an example of processed data of an edge image.

FIG. 8A illustrates an example of a scanning direction of the Sobel filter, which detects an edge from an image, and a processed state and a non-processed state of each data. FIG. 8B is a diagram illustrating an example of processed data of an edge image. In the example illustrated in FIGS. 8A and 8B, it is assumed that a position of the Sobel filter is scanned on an image in a horizontal direction moving from the left to the right of the image or in a direction in which eyes are aligned in order to accurately detect a feature of a boundary of an eye region in the left-right direction.

In non-processed data D71 illustrated in FIGS. 8A and 8B, it is assumed that the luminance of a region between a boundary D71a and a boundary D71b in the horizontal direction is black level as in the iris, and the luminance of the other regions is white level as a white part of the eye.

Therefore, in a case where the non-processed data D71 illustrated in FIGS. 8A and 8B is processed using the Sobel filter, edges having a change in luminance are detected at the positions of the respective boundaries D71a and D71b, and processed data D72 including this edge information is obtained. In this case, unlike an ordinary case where the Sobel filter is applied, the processed data D72 stores information regarding not only a gradient magnitude (edge strength) but also a positive or negative sign of gradient.

That is, in the processed data D72, a black value in a range of "−255 to −1" is stored at the position of the edge D72a, a white value in a range of "1 to 255" is stored at the position of the edge D72b, and a value "0" representing gray is stored in the other regions.

That is, as in the boundaries D71a and D71b of the non-processed data D71, the processed data D72 stores a positive or negative sign of gradient such that the boundary of the iris starting position where the luminance (gradation) changes from white to black and the boundary of the iris end position where the luminance (gradation) changes from black to white can be distinguished from each other. This way, data of an edge image D73 illustrated in FIG. 8B can be obtained. The data of the edge image D73 is suitable for detecting a feature of a boundary between the iris and a white part of an eye in a scanning direction (horizontal direction in FIGS. 8A and 8B).

<Specific Example of "Configuration B">

Figure 9:
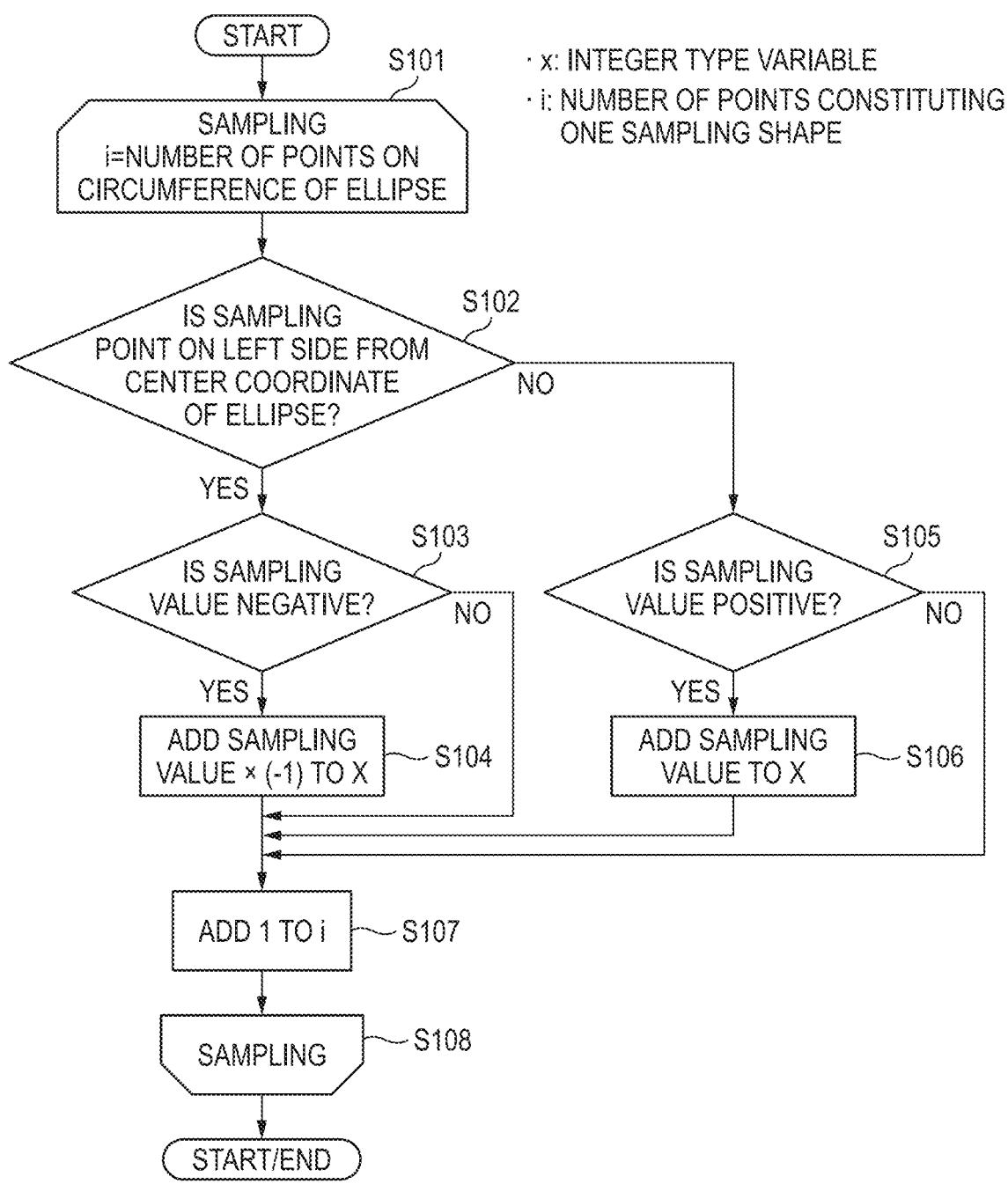
FIG. 9 is a flowchart illustrating the details of Step S18$d$ illustrated in FIG. 5.
Figure 10:
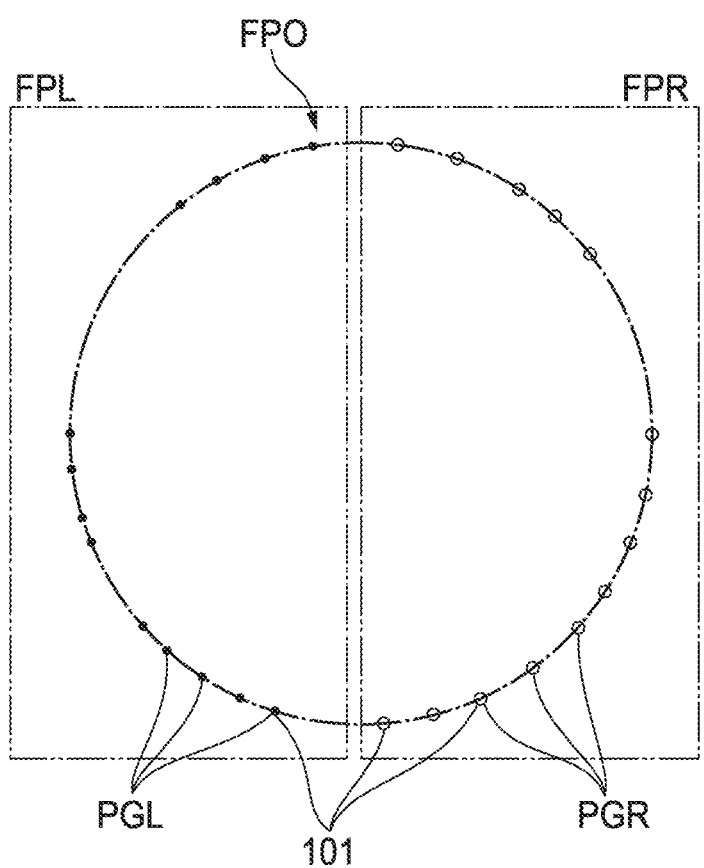
FIG. 10 is a schematic diagram illustrating a specific example of a pattern shape of a particle filter used for detecting an iris.

FIG. 9 illustrates the detailed procedure including characteristic features of "the sampling process" of Step S18d illustrated in FIG. 5. FIG. 10 illustrates a specific example of a pattern shape of a particle filter used for detecting the iris. In addition, FIGS. 11A and 11B are schematic diagrams illustrating specific examples of processing data in a case where a process illustrated in FIG. 9 is performed.

Figure 11A:
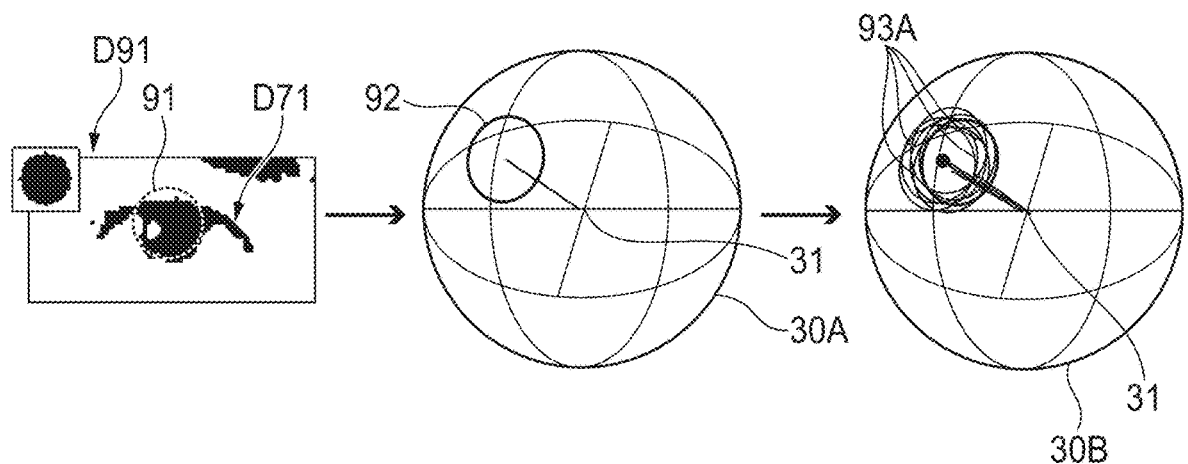
FIGS. 11A and 11B are schematic diagrams illustrating specific examples of processing data in a case where a process illustrated in FIG. 9 is performed.
Figure 11B:
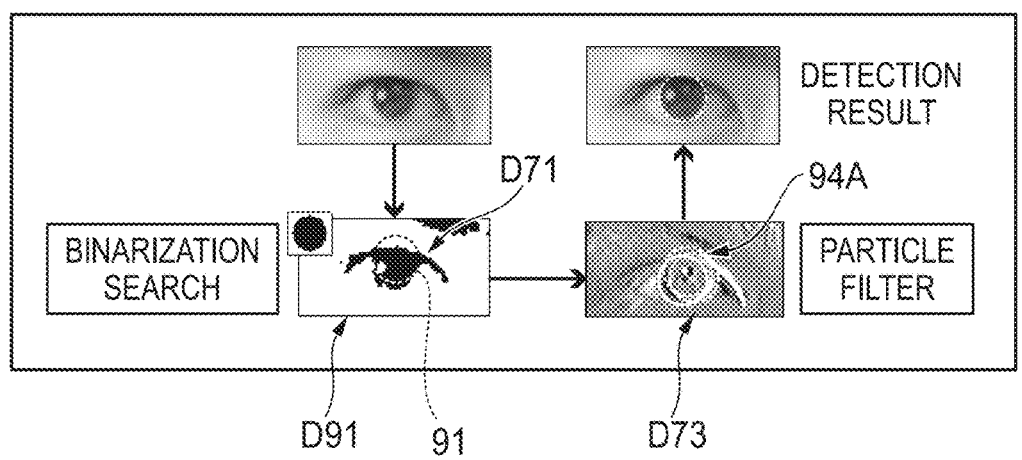

The pattern shape illustrated in FIG. 10 corresponds to sampling circles 93A and sampling ellipses 94A illustrated in FIGS. 11A and 11B, and is used for calculating an appropriate likelihood at a position of each of the sampling ellipses 94A in "the sampling process" illustrated in FIG. 9. Since FIG. 11A is the same as FIG. 6 except that an edge image D73 is illustrated instead of the edge image D92, the detailed description thereof will not be repeated. Since FIG. 11B is the same as FIG. 7 except that an edge image D73 is illustrated instead of the edge image D53, the detailed description thereof will not be repeated.

A filter pattern FP0 illustrated in FIG. 10 is formed in a circular (or elliptical) sphere shape, and plural sampling points 101 are disposed on the circumference at regular intervals. The total number of the sampling points 101 on the filter pattern FP0 is, for example, 120.

In addition, the filter pattern FP0 is divided into right and left semicircles at the center, and includes a pattern left region FPL corresponding to the left semicircle and a pattern right region FPR corresponding to the right semicircle. Sampling points 101 in the pattern left region FPL and sampling points 101 in the pattern right region FPR are set as left group points PGL and right group points PGR, respectively, and are distinguished from each other.

In Steps S101 to S108 of "the sampling process" illustrated in FIG. 9, the following process is sequentially performed on "i" number of sampling points 101 constituting one sampling ellipse 94A which is selected.

In Step S102, whether or not the corresponding sampling point 101 is on the left from a center coordinate of an ellipse, that is, whether or not the sampling point 101 is the left group point PGL is determined. In a case where the sampling point 101 is the left group point PGL, the process proceeds to Step S103. In a case where the sampling point 101 is the right group point PGR, the process proceeds to Step S105.

In Step S103, a value of one pixel of the edge image D73 illustrated in FIGS. 11A and 11B is obtained (sampled) at the position of one sampling point 101 which is currently selected, and whether or not the sign of the sampling value is positive or negative is determined. In a case where the sign of the sampling value is "negative", the process proceeds from Step S103 to Step S104. In a case where the sign of the sampling value is "positive", the process proceeds to Step S107.

In Step S104, the result of multiplying the present sampling value obtained in S103 by "−1" is added to a value of a variable X. That is, in this case, the sampling point 101 is the left group point PGL and belongs to the second point group. Therefore, the sampling value of the corresponding pixel having a negative gradient is set as a likelihood evaluation target. In order to adjust the sign of the sampling value to be "positive" during the calculation, the sampling value is multiplied by "−1" in Step S104.

In Step S105, a value of one pixel of the edge image D73 illustrated in FIGS. 11A and 11B is obtained (sampled) at the position of one sampling point 101 which is currently selected, and whether or not the sign of the sampling value is positive or negative is determined. In a case where the sign of the sampling value is "positive", the process proceeds from Step S105 to Step S106. In a case where the sign of the sampling value is "negative", the process proceeds to Step S107.

In Step S106, the present sampling value obtained in S105 is added to a value of the variable X. That is, in this case, the sampling point 101 is the right group point PGR and belongs to the first point group. Therefore, the sampling value of the corresponding pixel having a positive gradient is set as a likelihood evaluation target.

In Step S107, a value of a variable (i) representing a selection position of a sampling point 101, which is being processed on the circumference of the ellipse, is updated for the next position.

Once the processes of Steps S101 to S108 illustrated in FIG. 9 on all the sampling points 101 are completed, the variable X stores the sum of the likelihood evaluation values obtained from the respective sampling points 101. That is, the value of the variable X represents the likelihood with respect to one sampling ellipse 94A (see FIGS. 11A and 11B) which is currently selected.

By performing "the sampling process" illustrated in FIG. 9 on the data of the edge image D73 generated in "Configuration A", the features of positions where the positive-negative inversion of the edge strength occurs in the opposite boundaries of the iris can be accurately detected. That is, the likelihood of a sampling ellipse in which the edge strength on the right side from the center is positive and in which the edge strength on the left side from the center is negative is calculated to be high.

This way, the processes of Steps S101 to S108 are performed on all the sampling circles 93A, and a sampling circle 93A having the maximum likelihood is detected as the iris. In the image processing device according to the embodiment of the invention, in boundaries between a white part of an eye and the iris, the number of points having a positive edge strength is large in a right outline position of the iris, and the number of points having a negative edge strength is large in a left outline position of the iris. Therefore, the likelihood of a sampling circle 93A which is scattered at a position close to the outline positions of the iris is conspicuously high. As a result, in a highly disturbed environment, even in a case where it is erroneously determined that the iris is positioned at a position of an upper eyelid in an eye image by performing the binarization template matching, the likelihood of each sampling circle which is scattered based on the upper eyelid position is extremely low. Therefore, the sampling circle which is disposed at a position close to the upper eyelid side is excluded from iris candidates. This way, bad influences of unnecessary features which generate noise can be avoided with a small calculation amount, and the iris can be accurately detected.

As described above, even in a case where it is erroneously determined that the iris is positioned at a position of an upper eyelid in an eye image by performing the binarization template matching, it is necessary that the following point be noted in order to exclude a sampling circle, which is disposed at a position close to the upper eyelid side, from iris candidates. That is, in a case where the sampling circles 93A are scattered, the width of a numerical range of random numbers, which are introduced as the random number components (Ppd, Pyd) for determining the centers of the respective sampling circles 93A, is necessarily large. In a case where the width is small, the sampling circles 93A are locally scattered. In this case, the plural sampling circles 93A are scatted at wrong positions, and it is difficult to improve the detection accuracy of the iris. Therefore, even in a case where it is erroneously determined that the iris is positioned at a position of an upper eyelid in an eye image, when the sampling circles 93A are scattered around the wrong position, it is desired to adjust the total number of random number components and sampling circles as in the case where the sampling circles 93A are scattered around an appropriate position of the iris. By appropriately adjusting the total number of random number components and sampling circles, the process of Step S17 illustrated in FIG. 2 is not necessary.

In addition, in "the sampling process" illustrated in FIG. 9, it is assumed that the data (D72) of the edge image which is generated while scanning the data from the left to the right as shown in FIG. 8A is processed. In a case where the scanning direction during the generation of the edge image changes, the positive-negative inversion of the edge strength occurs, and the positions of the positive-negative inversion changes. Therefore, depending on the change in the scanning direction, it is necessary to change the details of Steps S102 to S106 in FIG. 9.

The scanning direction of the filter during the generation of the edge image is not limited to the direction in which both eyes are aligned or the horizontal direction. For example, it is considered that the scanning direction is changed to an oblique direction. However, it is preferable that the filtering direction in which an edge is detected is a horizontal direction or a direction in which both eyes are aligned because an edge in a boundary between the iris and a white part of an eye is more likely to be detected and the detection accuracy is more likely to be improved, for example, as compared to a case where the scanning direction is a vertical direction.

In the above description, the iris detection is performed on one image (first frame). In a case where the same detection is performed on an image of a second frame, the process of Step S17 illustrated in FIG. 2 can be canceled. The reason for this is as follows. Since a coordinate of an iris position detected in the first frame is already determined, a coordinate of an iris position in the second frame can be calculated based on the coordinate of the position in the first frame. That is, in order to detect the iris in the second frame, the sampling circles 93A may be scattered around the center position (Pp, Py) of the iris detected in the first frame. Similarly, in a third or subsequent frame, the sampling circles 93A may be scattered around a center position of the iris detected in the previous frame. This way, the amount of data processing required to detect the iris can be reduced.

Process of Second Embodiment

Figure 12:
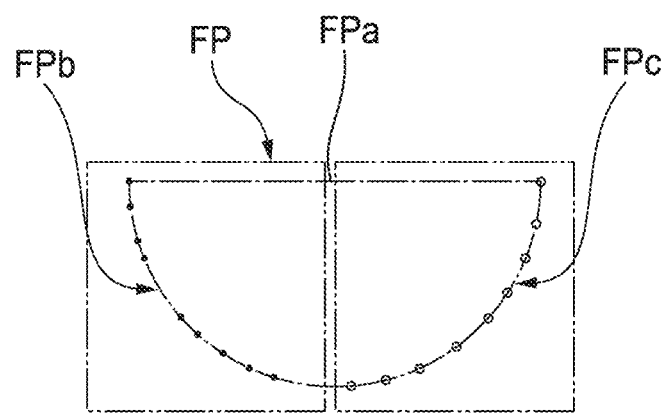
FIG. 12 is a schematic diagram illustrating a pattern shape of a particle filter according to a second embodiment.
Figure 13A:
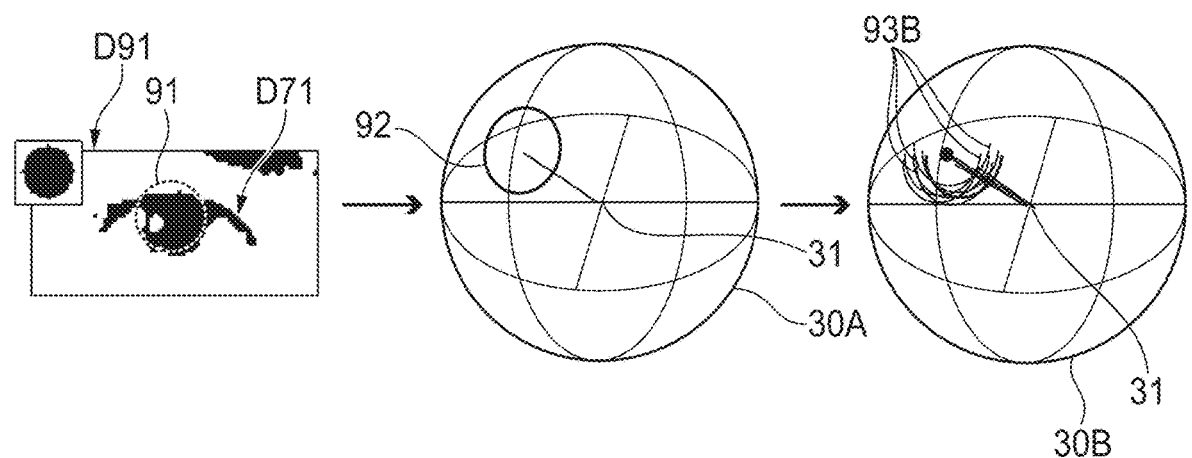
FIGS. 13A and 13B are schematic diagrams illustrating specific examples of processing data in a case where the pattern shape of the particle filter illustrated in FIG. 12 is applied.
Figure 13B:
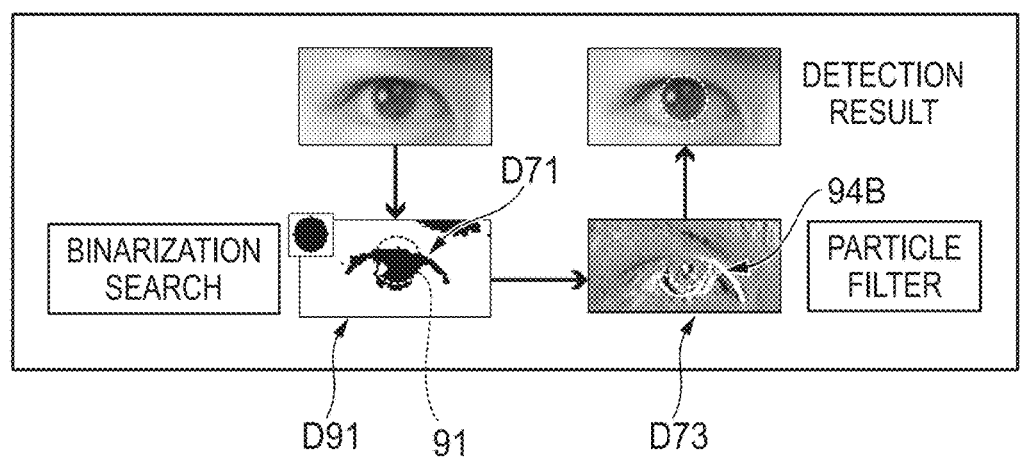

FIG. 12 illustrates an example of a pattern shape of a particle filter according to a second embodiment. FIGS. 13A and 13B are schematic diagrams illustrating specific examples of processing data in a case where the pattern shape of the particle filter illustrated in FIG. 12 is applied.

In the second embodiment, "sampling process" illustrated in FIGS. 13A and 13B is performed using a semicircular filter pattern FP illustrated in FIG. 12. That is, the same process as that of the first embodiment is performed except that the shape of the filter pattern changes. Since FIG. 13A is the same as FIG. 6 except that an edge image D73 is illustrated instead of the edge image D92, the detailed description thereof will not be repeated. Further, since FIG. 13B is the same as FIG. 7 except that an edge image D73 is illustrated instead of the edge image D53, the detailed description thereof will not be repeated.

The filter pattern FP illustrated in FIG. 12 is a semicircular arc-shaped pattern which swells downward, and is projected on the edge image D73, for example, on the two-dimensional plane as illustrated in FIG. 13B.

The filter pattern FP includes the plural sampling points 101 that are disposed on the circumference at regular intervals as in the case of the filter pattern FP0 illustrated in FIG. 10. The sampling points 101 are divided into points in a left region FPb and points in a right region FPc with a center FPa of the filter pattern FP as a boundary. That is, the sampling points 101 belonging to the left region FPb can be considered as the left group points PGL illustrated in FIG. 10, and the sampling points 101 belonging to the right region FPc can be considered as the right group points PGR illustrated in FIG. 10.

In a case where plural particles are scattered around the iris position obtained in the rough search, sampling circles 93B are disposed such that the center of the semicircular shape is disposed at a position in which different random number components (Ppd, Pyd) are added to the center position (Pp, Py) of the iris region 92. At this time, the sampling circles 93B are disposed in a state where the bottom of the arc as the most swelling part of the filter pattern shape faces downward in the eyeball 3D model 30.

The semicircular filter pattern FP is projected as the sampling ellipse 94B on the edge image D73 on the two-dimensional plane illustrated in FIG. 13B. Regarding an outline portion of a lower half region of the iris, a feature of the shape can be efficiently evaluated.

In general, boundaries between the iris and a white part of an eye tend to appear on the right side, the left side, and the lower side of the iris, and the upper side of the iris is likely to be a boundary between the iris and an upper eyelid. Therefore, by adopting the semicircular filter pattern FP illustrated in FIG. 12, matching between a sampling curve and each of the right side, the left side and the lower side of the iris where the boundaries of the iris can be accurately detected can be attempted. In other words, the upper side of the iris where the detection accuracy of the boundaries of the iris deteriorates can be excluded from the matching targets. Therefore, the iris can be accurately detected.

The shape of the filter pattern FP is not limited to a semicircular shape, and various arc shapes can be applied. The shape of the filter pattern FP may be a C-shape in which a part of a circle is deficient. At this time, it is preferable that the sampling circles are disposed in a state where the bottom as the most swelling part of the arc in the filter pattern shape faces downward in the eyeball 3D model 30.

<Specific Example of Process of Searching Pupil from Image>

Subsequently, the description will be given with respect to a process of searching the pupil from the image. In the "specific example of the process of searching the iris from the image" described above, in Step S42 of FIG. 4, the black circular image D4t having the shape similar to the shape of the iris is used as a template, and this template is scanned on the image of the data D42 while searching the position P41 of the iris having approximately the most similar feature, thereby identifying the position and the radius or diameter of the iris. In the process of searching the pupil from the image, basically, the pupil is searched by a process equivalent to the process described in the "specific example of the process of searching the iris from the image". That is, a black circular image having a shape similar to the shape of the pupil (the black circle similar to the shape of the pupil is smaller than the black circle similar to the shape of the iris) is used as a template, and this template is scanned on the image of the data D42 while searching the position of the pupil having approximately the most similar feature, thereby identifying the position and the radius or diameter of the pupil. In this way, when the shape of the black circle drawn in the image used as the template is changed, it is possible to select the object to be searched from the iris or the pupil.

Process of Third Embodiment

Figure 15:
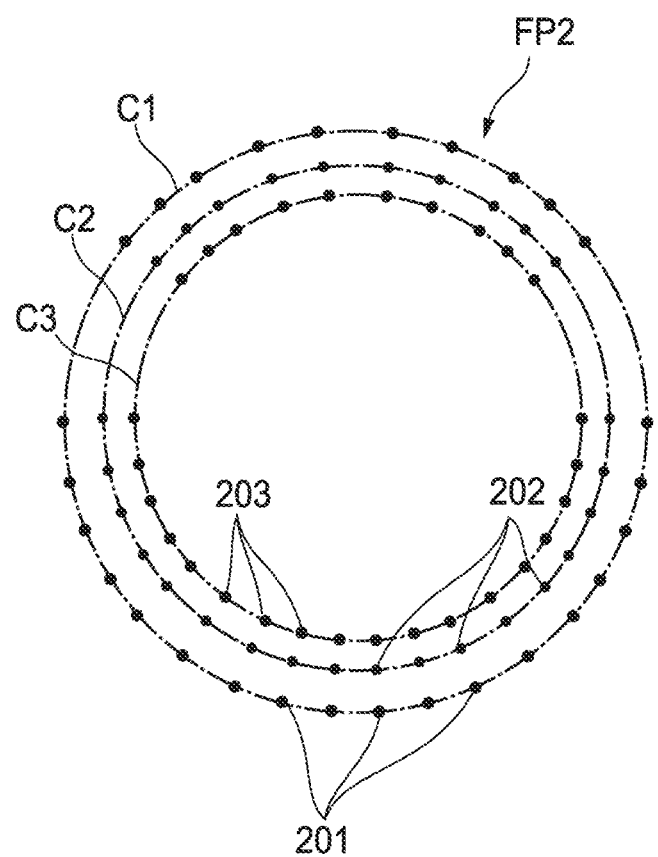
FIG. 15 is a schematic diagram illustrating a pattern shape of a particle filter according to a third embodiment.
Figure 16A:
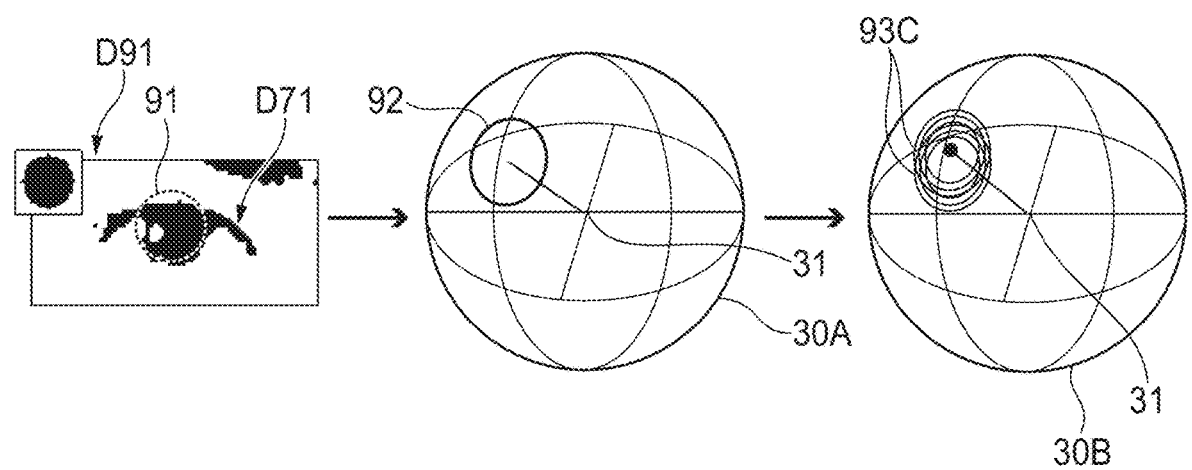
FIGS. 16A and 16B are schematic diagrams illustrating specific examples of processing data in a case where the pattern shape of the particle filter illustrated in FIG. 15 is applied.
Figure 16B:
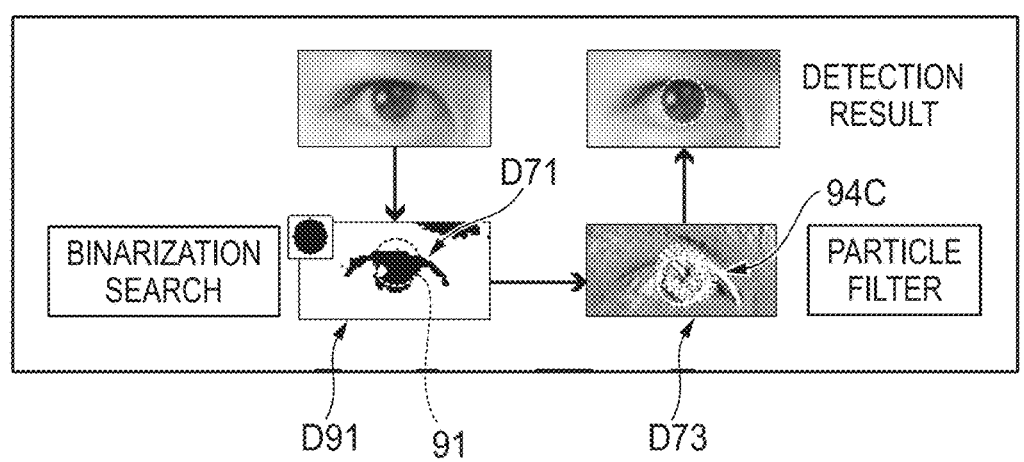

FIG. 15 illustrates an example of a pattern shape of a particle filter according to a third embodiment. FIGS. 16A and 16B are schematic diagrams illustrating specific examples of processing data in a case where the pattern shape of the particle filter illustrated in FIG. 15 is applied.

In the third embodiment, a "sampling process" illustrated in FIGS. 16A and 16B is performed using the semicircular filter pattern FP2 illustrated in FIG. 15. That is, the same process as that of the first embodiment is performed except that the shape of the filter pattern changes. Since FIG. 16A is the same as FIG. 6 except that an edge image D73 is illustrated instead of the edge image D92, the detailed description thereof will not be repeated. Further, FIG. 16B is the same as FIG. 7 except that an edge image D73 is illustrated instead of the edge image D53, the detailed description thereof will not be repeated.

The filter pattern FP2 illustrated in FIG. 15 is a circular pattern in which three circles C1, C2, and C3 having different radii have the same center point, and is projected on the edge image D73, for example, on the two-dimensional plane as illustrated in FIG. 16B.

The filter pattern FP2 has a large number of sampling points 201, 202, and 203 which are respectively arranged at regular intervals on the circumferences of the circles C1, C2, and C3. Further, the sampling points 201, 202, and 203 respectively corresponding to the circles C1, C2, and C3 are set to have the same number of sampling points, and are arranged radially so as to be aligned in a radial direction.

In a case where plural particles are scattered around the position of a pupil or an iris obtained in the rough search, sampling circles 93C are disposed such that the common center point for the three circles is disposed at a position in which different random number components (Ppd, Pyd) are added to the center position (Pp, Py) of a pupil or iris region 92.

The filter pattern FP2 constituted by these three circles is projected as a sampling ellipse 94C on the edge image D73 on the two-dimensional plane as illustrated in FIG. 16B.

Generally, in the case of generating the image obtained by capturing the iris or the pupil, the dimensions (the number of pixels in the vertical and horizontal directions) of the iris or the pupil in the image change even when the same iris or the pupil is captured as a capturing object. Not only the dimension of the iris or the pupil in the captured image changes due to the change in the pupil diameter according to the quantity of light, but also the dimension of the iris or the pupil in the captured image changes when the head moves in the direction toward or away from the camera, for example, even when the diameter of the iris or the pupil does not change. As described above, it is also important to search for an iris or a pupil while coping with the change in iris diameter or pupil diameter.

In this regard, it is possible to cope with the change in iris diameter or pupil diameter by each of the triple circles in the filter pattern FP2 of the third embodiment. That is, even when an iris or a pupil captured in an image frame at a certain time point t1 is changed in diameter in an image frame at a next time point t2, circles C1, C2, and C3 larger or smaller than the circles C1, C2, and C3 catching the iris or the pupil at the time point t1 can catch the iris or the pupil at the time point t2. As described above, according to the third embodiment, it is possible to accurately search the iris or the pupil while coping with the change in iris diameter or pupil diameter.

Note that the third embodiment of the present invention can be applied to the filter pattern described in the first embodiment or the second embodiment and can also be applied to the filter pattern described with reference to FIG. 6.

The image processing device according to the third embodiment of the present invention will be briefly described as follows.

An image processing device including a data processing unit that processes data of a face image which is captured to include a face, wherein the data processing unit:

generates an edge image, which stores information regarding a gradient magnitude, by filtering the face image to detect an edge in a scanning direction;

extracts, in a state where a sampling curve is projected on the edge image, a gradient magnitude as a sampling value from each of positions in the edge image each corresponding to a plurality of points constituting the sampling curve, the sampling curve being virtually positioned on a plane of a three-dimensional model and having a plurality of circles of different radii arranged with the same position as a center point, the extracted gradient magnitude as the sampling value being a likelihood evaluation target; and detects a sampling curve having a maximum likelihood as a pupil or an iris among a plurality of sampling curves.

<Application of Technique of Image Processing Device>

The technique of the image processing device according to the invention can be used not only for detecting an eye but also for other applications. Specific examples include head movement tracing, eyelid detection, and mouth detection, for example. In a case where the technique of the image processing device according to the invention is actually applied to head movement tracing, the scattering shape size of the particle filter can be adjusted to a head size in an image. In addition, in a case where the technique of the image processing device according to the invention is actually applied to eyelid or mouth detection, the Sobel filter can be used in the longitudinal direction, and the signs of the sampling feature can be divided in the longitudinal direction.

For example, the respective operations illustrated in FIGS. 2, 4, 5, and 9 can be realized by hardware such as a dedicated logic circuit, or can also be realized by software including a program or data which can be read and executed by various computers for control.

<Improvement of Accuracy>

Figure 14:
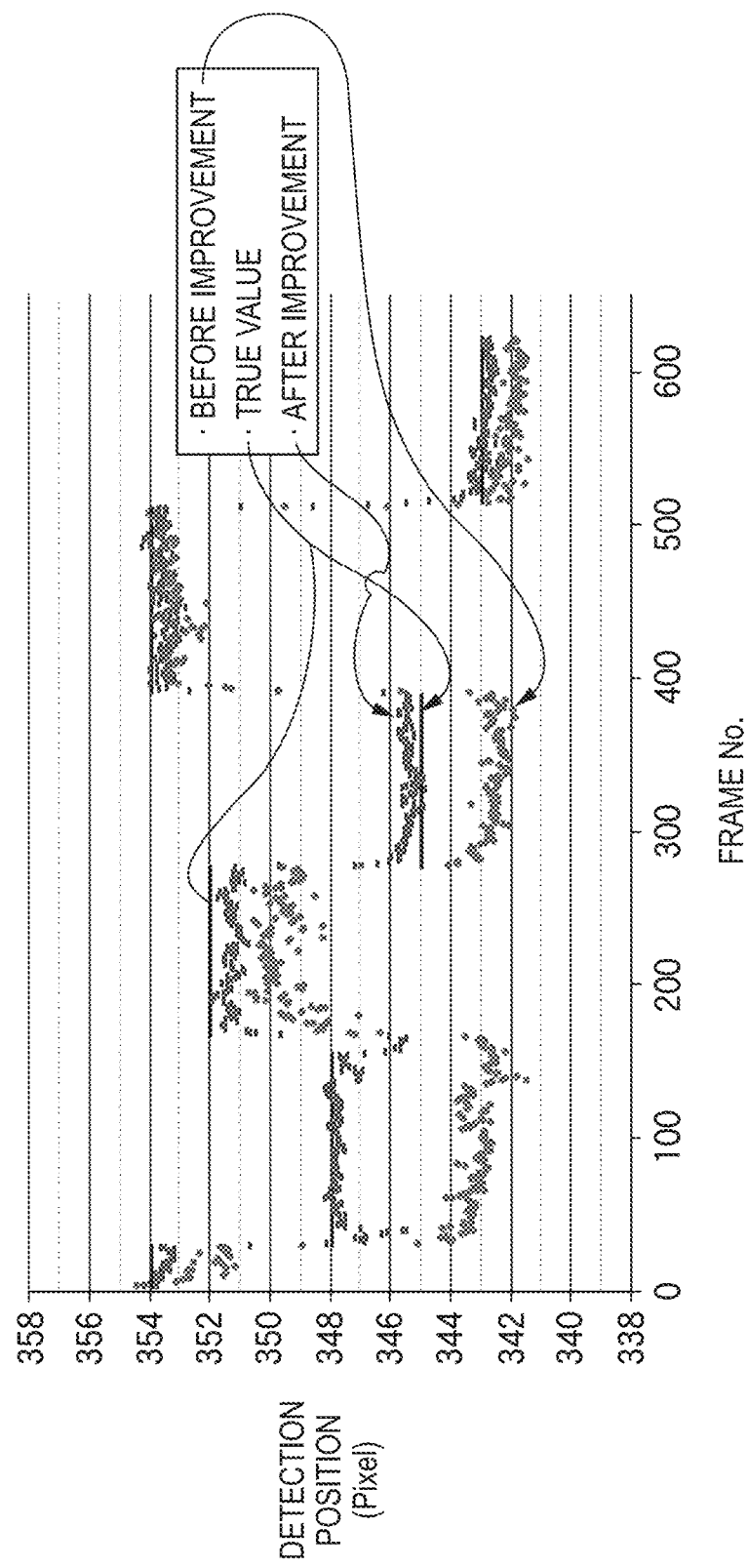
FIG. 14 is a graph illustrating an example of a relationship between whether or not the invention is applied and detection error.

FIG. 14 illustrates an example of a relationship between whether or not the invention is applied and a detection error. That is, FIG. 14 illustrates a difference in the detection error between a method to which the invention is applied and a method of the related art under conditions where the accuracy deteriorates due to ambient light.

In FIG. 14, "After Improvement" corresponds to the detection results of the method to which the invention is applied, and "Before Improvement" corresponds to the detection results of the method to which the invention is not applied. Referring to FIG. 14, an average error from a true value is 1.6 pixel in the related art. On the other hand, an average error from a true value is improved to 0.5 pixel in the method according to the invention.

Here, the characteristics of the embodiments of the image processing device, the image processing method, and the image processing program according to the invention will be collectively described in brief in the following [1] to [6].

[1] An image processing device including:
a data processing unit (processing unit 13) that processes data of a face image which is captured to include a face,
wherein the data processing unit:
generates an edge image (D73), which stores information regarding a gradient magnitude and whether the gradient is positive or negative, by filtering the face image to detect an edge in a scanning direction;
extracts (S103, S105), in a state (sampling ellipse 94A, 94B) where a sampling curve (sampling circles 93A, 93B) including an arc-shaped curve, which is virtually positioned on a plane of a three-dimensional model (eyeball 3D model 30), is projected on the edge image, the gradient magnitude and whether the gradient is positive or negative as a sampling value from each of positions in the edge image corresponding to a plurality of points (sampling points 101) constituting the sampling curve;
calculates (S103, S104) a likelihood with respect to the sampling curve by setting (S105, S106) points having a positive gradient as likelihood evaluation targets in a first point group (right group points PGR) which is positioned on a front side in the scanning direction among the plurality of points constituting the sampling curve, and setting points having a negative gradient as likelihood evaluation targets in a second point group (left group points PGL) which is positioned on a rear side in the scanning direction among the plurality of points constituting the sampling curve; and
detects (S18*f*) a sampling curve having a maximum likelihood as a pupil or an iris among a plurality of sampling curves.

[2] The image processing device according to [1],
wherein the scanning direction in which the data processing unit detects an edge by filtering is a direction in which eyes are aligned in the face image (refer to FIGS. 8A and 8B).

[3] The image processing device according to [2],
wherein the sampling curve (filter pattern FP) has an arc shape and is projected on the edge image in a state where a bottom as a most swelling part of the arc faces downward in the three-dimensional model (refer to FIG. 12).

[4] The image processing device according to [1],
wherein the data processing unit calculates a likelihood with respect to the sampling curve by adding (S105, S106) gradient magnitudes of the points having a positive gradient in the first point group and adding (S103, S104) gradient magnitudes of the points having a negative gradient in the second point group.

[5] An image processing method using an image processing device,
including a data processing unit that processes data of a face image which is captured to include a face,
the image processing method including:

a step (S43) of generating an edge image (D73), which stores information regarding a gradient magnitude and whether the gradient is positive or negative, using a filter that detects an edge in the face image in a scanning direction;
a step (S103, S105) of extracting, in a state (sampling ellipse 94A, 94B) where a sampling curve (sampling circle 93A, 93B) including an arc-shaped curve, which is virtually positioned on a plane of a three-dimensional model, is projected on the edge image, the gradient magnitude and whether the gradient is positive or negative as a sampling value from each of positions in the edge image corresponding to a plurality of points constituting the sampling curve;
a step (S104, S106) of calculating a likelihood with respect to the sampling curve by setting (S105) points having a positive gradient as likelihood evaluation targets in a first point group which is positioned on a front side in the scanning direction among the plurality of points constituting the sampling curve, and setting (S103) points having a negative gradient as likelihood evaluation targets in a second point group which is positioned on a rear side in the scanning direction among the plurality of points constituting the sampling curve; and
a step (S18*f*) of detecting a sampling curve having a maximum likelihood as a pupil or an iris among a plurality of sampling curves.

[6] A non-transitory computer readable medium storing a program causing a computer to execute a process for processing an image which is captured to include a face,
the process comprising:
a step (S43) of generating an edge image (D73), which stores information regarding a gradient magnitude and whether the gradient is positive or negative, using a filter that detects an edge in the face image in a scanning direction;
a step (S103, S105) of extracting, in a state (sampling ellipse 94A, 94B) where a sampling curve (sampling circle 93A, 93B) including an arc-shaped curve, which is virtually positioned on a plane of a three-dimensional model, is projected on the edge image, the gradient magnitude and whether the gradient is positive or negative as a sampling value from each of positions in the edge image corresponding to a plurality of points constituting the sampling curve;
a step (S104, S106) of calculating a likelihood with respect to the sampling curve by setting (S105) points having a positive gradient as likelihood evaluation targets in a first point group which is positioned on a front side in the scanning direction among the plurality of points constituting the sampling curve, and setting (S103) points having a negative gradient as likelihood evaluation targets in a second point group which is positioned on a rear side in the scanning direction among the plurality of points constituting the sampling curve; and
a step (S18*f*) of detecting a sampling curve having a maximum likelihood as a pupil or an iris among a plurality of sampling curves.

[7] An image processing program that allows a computer to execute the respective steps of the image processing method according to [5].

What is claimed is:
1. An image processing device comprising:
a data processing unit that processes data of a face image which is captured to include a face,
wherein the data processing unit:
generates an edge image, which stores information regarding a gradient magnitude and whether the gradi- ent is positive or negative, by filtering the face image to detect an edge in a scanning direction;

extracts, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;

calculates a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and detects a sampling curve having a maximum likelihood as a pupil or an iris among a plurality of sampling curves.

2. The image processing device according to claim 1, wherein the scanning direction in which the data processing unit detects an edge by filtering is a direction in which eyes are aligned in the face image.

3. The image processing device according to claim 2, wherein the sampling curve has an arc shape and is projected on the edge image in a state where a bottom as a most swelling part of the arc faces downward in the three-dimensional model.

4. The image processing device according to claim 1, wherein the data processing unit calculates a likelihood with respect to the sampling curve by adding gradient magnitudes of the points having a positive gradient in the first point group and adding gradient magnitudes of the points having a negative gradient in the second point group.

5. An image processing method using an image processing device including a data processing unit that processes data of a face image which is captured to include a face, the image processing method comprising:

generating an edge image, which stores information regarding a gradient magnitude and whether the gradient is positive or negative, using a filter that detects an edge in the face image in a scanning direction;

extracting, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;

calculating a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and detecting a sampling curve having a maximum likelihood as a pupil or an iris among a plurality of sampling curves.

6. A non-transitory computer readable medium storing a program causing a computer to execute a process for processing an image which is captured to include a face, the process comprising:

generating an edge image, which stores information regarding a gradient magnitude and whether the gradient is positive or negative, using a filter that detects an edge in the face image in a scanning direction;

extracting, in a state where a sampling curve including an arc-shaped curve, which is virtually positioned on a plane of a three-dimensional model, is projected on the edge image, a sampling value as the information regarding a gradient magnitude and whether the gradient is positive or negative from each of positions in the edge image corresponding to a plurality of points constituting the sampling curve;

calculating a likelihood with respect to the sampling curve by setting points having a positive gradient as likelihood evaluation targets in a first point group which is positioned on a front side in the scanning direction among the plurality of points constituting the sampling curve, and setting points having a negative gradient as likelihood evaluation targets in a second point group which is positioned on a rear side in the scanning direction among the plurality of points constituting the sampling curve; and detecting a sampling curve having a maximum likelihood as a pupil or an iris among a plurality of sampling curves.

* * * * *